(12) United States Patent
Balachandran et al.

(10) Patent No.: US 7,356,561 B2
(45) Date of Patent: Apr. 8, 2008

(54) ADAPTIVE SLEEPING AND AWAKENING PROTOCOL FOR AN ENERGY-EFFICIENT ADHOC NETWORK

(75) Inventors: Krishna Balachandran, Morganville, NJ (US); Joseph H. Kang, Belle Mead, NJ (US); Wing Cheong Lau, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 780 days.

(21) Appl. No.: 10/426,691

(22) Filed: May 1, 2003

(65) Prior Publication Data

US 2004/0230638 A1    Nov. 18, 2004

(51) Int. Cl.
*H04B 7/00*    (2006.01)

(52) U.S. Cl. .................. 709/203; 709/224; 709/227; 370/356; 370/310; 455/574

(58) Field of Classification Search ........... 709/224, 709/228, 207, 220, 203, 227; 370/338, 347, 370/310, 356; 375/134; 455/574
See application file for complete search history.

(56) References Cited

U.S. PATENT DOCUMENTS

| | | | |
|---|---|---|---|
| 5,038,022 A | 8/1991 | Lucero | |
| 5,221,838 A | 6/1993 | Gutman et al. | |
| 5,392,287 A | 2/1995 | Tiedemann, Jr. et al. | |
| 5,457,306 A | 10/1995 | Lucero | |
| 5,471,212 A * | 11/1995 | Sharpe et al. | 342/51 |
| 5,559,312 A | 9/1996 | Lucero | |
| 5,621,412 A * | 4/1997 | Sharpe et al. | 340/10.33 |
| 5,811,772 A | 9/1998 | Lucero | |
| 5,952,640 A | 9/1999 | Lucero | |
| 5,959,277 A | 9/1999 | Lucero | |
| 6,019,283 A | 2/2000 | Lucero | |
| 6,142,369 A | 11/2000 | Jonstromer | |
| 6,190,256 B1 | 2/2001 | Walker et al. | |
| 6,206,283 B1 | 3/2001 | Bansal et al. | |
| 6,292,508 B1 * | 9/2001 | Hong et al. | 375/134 |
| 6,378,073 B1 | 4/2002 | Davis et al. | |
| 6,542,495 B1 * | 4/2003 | Sugita | 370/347 |
| 2003/0099221 A1 * | 5/2003 | Rhee | 370/338 |
| 2003/0152041 A1 * | 8/2003 | Herrmann et al. | 370/310 |
| 2003/0236866 A1 * | 12/2003 | Light | 709/220 |

FOREIGN PATENT DOCUMENTS

WO    WO 00/48367    8/2000

OTHER PUBLICATIONS

European Search Report dated Aug. 24, 2004.

\* cited by examiner

*Primary Examiner*—Khanh Dinh

(57) ABSTRACT

In a multiple node network, the method includes waking up at least one node from a sleep mode during at least one associated slot of a time-slotted frame, the sleep mode being a low power consumption mode. Also, in at least one node of a multiple node network, the period of time a node sleeps is based on the residual energy of the node, the residual energy of the nodes in the neighborhood, neighborhood node density, and combinations thereof.

11 Claims, 2 Drawing Sheets

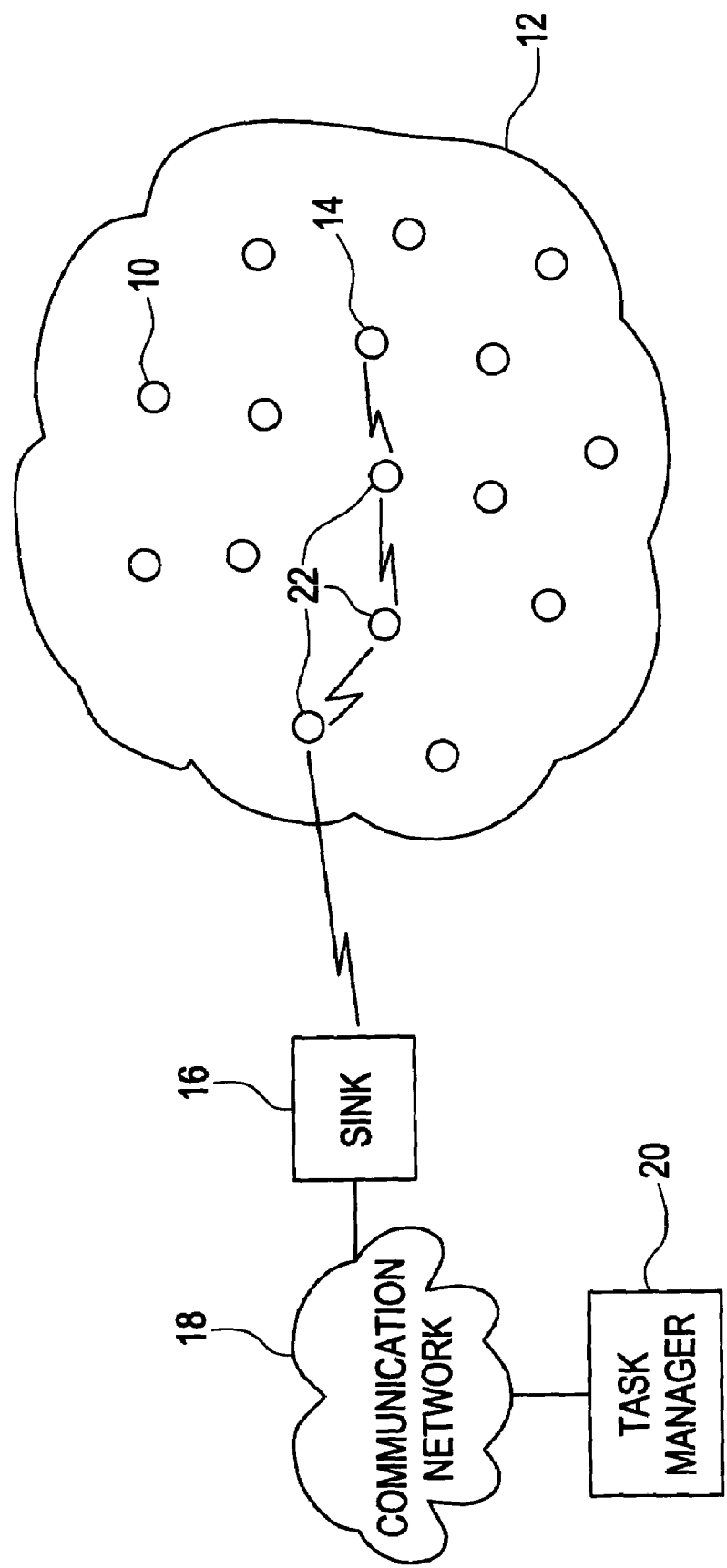

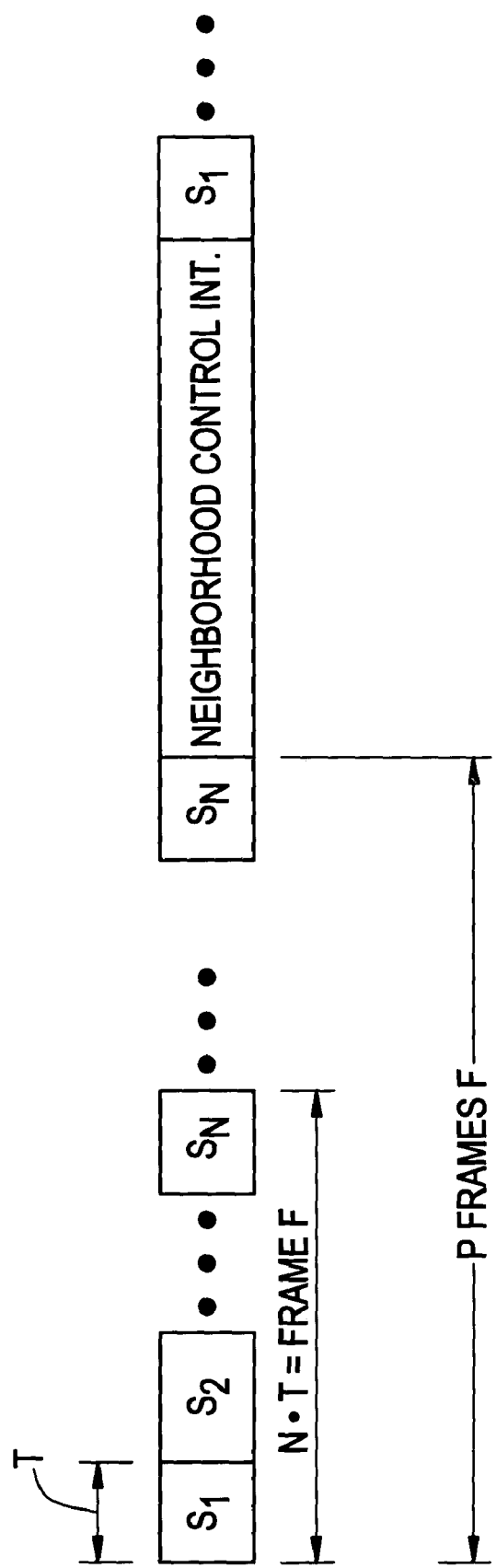

ADAPTIVE SLEEPING AND AWAKENING PROTOCOL FOR AN ENERGY-EFFICIENT ADHOC NETWORK

BACKGROUND OF THE INVENTION

Recent advances in micro-electro-mechanical systems (MEMS) technology, wireless communications, and digital electronics have enabled the development of low-cost, low-power, multifunction sensor nodes that are small in size and communicate un-tethered in short distances. These tiny sensor nodes, which consist of sensing, data processing, and communicating components, leverage the idea of sensor networks based on the collaborative effort of a large number of nodes.

A sensor network is composed of a large number of sensor nodes. Sensor networks may consist of many different types of sensors such as seismic, low sampling rate magnetic, thermal, visual, infrared, acoustic, radar, etc. that are able to monitor a wide variety of ambient conditions.

Sensor nodes can be used for continuous sensing, event detection, event ID, location sensing, and local control of actuators. The concept of micro-sensing and wireless connection of these nodes promise many new application areas. Example applications include military, environment, health, home and other commercial areas. It is possible to expand this classification with more categories such as space exploration, chemical processing and disaster relief.

FIG. 1 illustrates one example a sensor network. As shown, a plurality of sensor nodes 10 are distributed in a sensor field 12. When a sensor node 10 senses, for example, an event, the sensor node 10 attempts to transmit a message containing information regarding the event to a sink 16. The sink 16 may be a gateway for a communication network 18 such as the internet, a wireless communication network, a satellite network etc. The message is routed by the communication network 18 to a task manager 20 (e.g., a server or computer system), which performs a task based on the information contained in the message.

A sensing node 10 that transmits a message after sensing, for example, an event is referred to as a source node 14. In attempting to send the message to the sink 16, the source node 14 may not transmit at a high enough power, or be located close enough to the sink 16, for the sink 16 to directly receive the message from the source node 14. Accordingly, the sensor nodes 10 are configured to receive messages from the other sensor nodes 10 located nearby and relay the received message to other nearby sensor nodes 10 such that the messages make forward progress towards the sink 16. The sensor nodes 10 via which the message travels from the source node 14 to the sink 16 are referred to as relay nodes 22. Each sensor node 10 can assume the role of source, relay and/or sink. Each transfer of the message from one sensor node 10 to another sensor node 10 is referred to as a hop, and the amount of time to complete a hop is referred to as the hop latency.

One of the challenges faced in sensor networks is minimizing power consumption. Sensor nodes are often inaccessible, and the lifetime of the sensor nodes, and thus the sensor network, depends on the lifetime of the power resources (e.g., battery life) for the sensor nodes. For adhoc networking (e.g., sensor networks), energy efficiency can be achieved by techniques that minimize transmission and reception power at the nodes (e.g., sensor nodes) where processing power has been classified into two classes: idle and receive. When, transmit/receive states of the nodes are uncommon due to infrequent messaging, significant energy savings can be achieved by allowing the nodes to enter a sleep mode of operation where no receiver processing is performed. Research in sleep patterns has typically considered two cases: nodes with asynchronous, independent sleep patterns and synchronous sleep/wake cycles between nodes in a local neighborhood.

In an asynchronous system, when a node wakes up, it has to stay awake for a substantial period of time in order to catch the retransmission of messages that arrived while the node was asleep. The overall duty-cycle of a node (and thus its energy consumption) can only be lowered by about 50% in order to avoid excessive overhead caused by extremely small retransmission time-out values. The need of an extended listening period of a newly awake node may be eliminated by requiring an active node to stay awake and listen continuously until its energy is depleted. While this approach can eliminate the receiver wake-up latency, it does not exploit the potential energy savings of switching off the transmission/reception processing of a node while keeping its sensing/monitoring processing active.

Energy consumption can be reduced by synchronizing all nodes in a neighborhood to wake up in the same time-slot within a multi-slot frame. However, because all message exchanges within a neighborhood can only be conducted once every frame, the average per-hop latency is half of the frame interval. Excessive collisions (and thus delay) is likely to occur when multiple node-pairs within the same neighborhood try to communicate with each other during the same frame.

While the sleep mode can provide significant savings in energy, it can also introduce significant delays and impair the ability of the multiple node network to convey a message in a timely manner. Most existing sleeping approaches do not support flexible trade-offs between energy savings and latency.

SUMMARY OF THE INVENTION

The present invention provides methodologies for scheduling the awakening of nodes and for adaptively setting sleep periods of nodes in a synchronous multiple node adhoc network. Because the network is synchronized, a slot and frame structure for the communication of messages within the network may be defined. One or more nodes within the network enters into a sleep mode (i.e., a low power consumption mode) during which it awakens at pre-determined slot(s) of a frame and listens for transmissions from its immediate neighbors. The awakening slots for each node in a sleep mode may be determined using a known process (e.g. any well-known hashing algorithm). Furthermore, using knowledge of the process employed by a neighboring node to determine its awakening slots, a node may also determine when that neighboring node awakens. In an exemplary embodiment, a node address is used to identify each node. This address may be a unique identifier assigned to the node by the manufacturer. Each node in a sleep mode then uses any well-known hashing algorithm to hash the address to one or more slots in the frame. The slot(s) to which a node hashes becomes the awake slot(s) for that node. Accordingly, when the sleep period for a node expires, the node will awake during its awake slot(s). In this manner, the nodes are randomly distributed among the slots of the frame. Furthermore, if a node has knowledge of the addresses of its immediate neighbors and the respective hashing algorithm(s) employed, it can then determine the awake slots of its neighbors. This neighbor awake slot information can then be used in scheduling transmissions within the neighborhood.

In an exemplary embodiment, the nodes awaken during a neighborhood control interval that occurs every predetermined number of frames. The nodes transmit messages providing their addresses and position during this interval, and receive the addresses and/or positions of their neighbors. In one exemplary embodiment, a node considers another node as its neighbor when the signal strength of a received transmission from the other node exceeds a signal strength threshold.

In one exemplary embodiment, the nodes may belong to one of M sleeper classes, wherein M is an integer greater than 1. Each sleeper class has a predefined sleep period associated therewith and predefined network operating characteristics associated therewith. The predefined network operating characteristics may include, for example, whether nodes of a particular sleeper class can serve as relay nodes. A relay node is a node that receives and retransmits messages from the other nodes.

In an exemplary embodiment, the lower the sleeper class, the shorter the sleep period and, possibly, the greater the processing burden placed on the node by the network operating characteristics. Namely, the lower the sleeper class the more energy the node will consume because of awakening more often and possibly having a greater processing burden (e.g. serving as a relay node). For example, in one embodiment, nodes below a predetermined sleeper class function as relay nodes.

During operation, a node adaptively changes its sleeper class. This has the effect of adaptively changing the sleep period, possibly the processing burden, and the energy consumption of the node.

In an exemplary embodiment, this adaptive change operation takes place during the neighborhood control interval. The adaptive change operation may be performed based on the residual energy of the node alone, the residual energy of the neighboring nodes, node density and combinations thereof

BRIEF DESCRIPTION OF THE DRAWINGS

The present invention will become more fully understood from the detailed description given below and the accompanying drawings, wherein like elements are represented by like reference numerals, which are given by way of illustration only and thus are not a limit on the present invention and wherein:

FIG. 1 illustrates a prior art sensor network; and
FIG. 2 illustrates a slot and a frame structure used by a sensor network employing the methodologies of the present invention.

DETAILED DESCRIPTION OF THE EMBODIMENTS

The methodologies of the present invention for multiple node adhoc networks will be described in the context of a sensor network; and more particularly, the sensor network of FIG. 1. However, it will be understood that the present invention is not limited to the sensor network of FIG. 1 or strictly sensor networks.

The present invention provides methodologies for scheduling the awakening of nodes and for adaptively setting sleep periods of nodes in a synchronous multiple node adhoc network. Synchronizing multiple node adhoc networks, such as the sensor network of FIG. 1, is well-known. For example, according to one well-known technique each of the nodes, for example sensor nodes 10, includes a global positioning sensor (GPS) receiver. This technique allows for synchronization between nodes to within a micro-second. Other methods of ranging and distributed synchronization within multiple node network are also well-known.

Because the network is synchronized, a slot and frame structure for the communication of messages within the network may be defined. FIG. 2 illustrates a slot and frame structure used by a sensor network employing the methodologies of the present invention. As shown, a frame F contains N slots S1, S2, ... $S_N$, each of duration T where N is an integer greater than 1. Hence, a frame F has a duration of T*N. As further shown, after every P frames F, a neighborhood control interval takes place. The neighborhood control interval will be discussed in greater detail below.

Next, the method of scheduling the awakening of nodes will be described as implemented in the sensor network of FIG. 1 and with references to the slot and frame structure of FIG. 2. Each sensor node 10 includes an address. For example, the address may be a unique identifier assigned to the sensor node 10 by the manufacturer. Each sensor node uses any well-known hashing algorithm to hash the address to one or more slots S in the frame F (e.g., using hashing algorithms used by wireless mobile stations to hash their unique identifier to a particular paging channel). The slot(s) S to which a sensor node 10 hashes becomes the awake slot(s) for that sensor node 10. Accordingly, when the sleep period for a sensor node 10 expires, the sensor node 10 will awake during its awake slot(s). In this manner, the sensor nodes 10 are randomly distributed among the slots S of the frame F. Determining the sleep period for a sensor node 10 will be described in greater detail below.

During the neighborhood control interval, in an exemplary embodiment, all of the sensor nodes 10 awake. The sensor nodes 10 transmit messages providing their awakening slots, addresses and/or positions during this interval, and receive the same information from their neighbors. In one exemplary embodiment, a sensor node 10 considers another sensor node 10 as its neighbor when the signal strength of a received transmission from the other sensor node 10 exceeds a signal strength threshold. In another exemplary embodiment, the sensor nodes 10 also use the position information for the other sensor nodes 10 to determine whether another sensor node 10 is a neighbor sensor node 10. In one exemplary embodiment, the sensor node 10 determines the number of sensor nodes 10 satisfying the signal strength requirement discussed above. Based on this determined number, which indicates a density of the sensor field 12 with respect to the sensor node 10, the sensor node 10 establishes a neighborhood radius. For example, the sensor node 10 stores a look-up table for mapping the determined number to a neighborhood radius. The other sensor nodes 10 having a position that falls within the neighborhood radius are then determined as neighbor sensor nodes 10.

Each sensor node 10 stores the addresses and positions of its neighbor sensor nodes 10, and determines the slots S during which the neighbor sensor nodes 10 awaken. Because a sensor node 10 knows when its neighbor sensor nodes 10 awaken during a frame and know the position of the neighbor sensor nodes 10, the sensor node 10 can perform a form of directional transmission. Namely, by transmitting when those sensor nodes 10 in a particular direction will awaken, the sensor node 10 sends a message in a particular direction. Furthermore, per-hop delay constraints can also be satisfied if the sensor node 10 attempts to forward the message to one or more of the neighboring sensor nodes that will awaken during the desired single hop delay budget.

Next, the method of adaptively setting sleep periods of nodes in a synchronous multiple node adhoc network will be described with for the sensor network of FIG. 1 and with reference to FIG. 2. In one exemplary embodiment, the sensor nodes 10 may belong to one of M sleeper classes, wherein M is an integer greater than 1. Each sleeper class has a predefined sleep period associated therewith and predefined network operating characteristics associated therewith. The predefined network operating characteristics may include, for example, whether sensor nodes of a particular sleeper class can serve as relay nodes. A relay node is a sensor node 10 that receives and relays messages from the other sensor nodes 10.

In an exemplary embodiment, the lower the sleeper class, the shorter the sleep period and, possibly, the greater the processing burden placed on the sensor node 10 by the network operating characteristics. Namely, the lower the sleeper class the more energy the sensor node 10 will consume because of awakening more often and possibly having a greater processing burden (e.g. serving as a relay node). For example, in one embodiment, sensor nodes 10 below a predetermined sleeper class function as relay nodes.

When a sensor node 10 initially starts operation, the sensor node 10 starts in a default sleeper class. In one embodiment, the default sleeper class is the lowest sleeper class. During operation, however, the sensor node 10 adaptively changes its sleeper class. This has the effect of adaptively changing the sleep period, possible the processing burden, and the energy consumption of the sensor node 10.

In an exemplary embodiment, this adaptive change operation takes place during the neighborhood control interval. The adaptive change operation may be performed based on the residual energy of the sensor node 10 alone, the residual energy of the neighbor sensor nodes 10, node density for the neighborhood of the sensor node 10, and combinations thereof.

Each sensor node 10 includes an amount of available energy, for example battery life, for powering its operation. This amount of available energy is typically referred to as the residual energy of the sensor node 10.

When the adaptive change operation is performed based on the residual energy of the sensor node 10 alone, the sensor node 10 stores a look-up table mapping residual energy to a sleeper class. The look-up table maps residual energy to sleeper classes such that the higher the residual energy, the lower the sleeper class. Hence, there is an inverse relationship between residual energy and sleep period and, possibly processing load. The sensor node 10 maps its residual energy to a sleeper class using the look-up table. Instead of using a look-up table, the sensor node 10 may achieve the same result by comparing its residual energy to a set of thresholds that define the sleeper classes. For example, if the sensor network include two sleeper classes—short sleepers and long sleepers, only a single threshold would be needed. If the residual energy is less than or equal to the threshold, the sensor node 10 determines itself to be a long sleeper; otherwise, the sensor node 10 determines itself to be short sleeper.

When the sensor nodes 10 determine their sleeper class based on their residual energy and the residual energy of the neighbor sensor nodes 10, the messages sent by the sensor nodes 10 during the neighborhood control interval also indicate the residual energy of the sensor node 10 sending the message. In one exemplary embodiment, the sensor node 10 determines the average residual energy of the neighbor sensor nodes 10, and selects one of several look-up tables using the determined average residual energy. Each of the look-up tables has the same structure as in the previously described embodiment. However, the look-up tables differ in the residual energies associated with the different sleeper classes. For example, the greater the average residual energy, the higher the residual energy the sensor node 10 will need to have to qualify as a lower sleeper class.

In another exemplary embodiment, the sensor node 10 establishes the thresholds for determining its sleeper class based on, for example, the average residual energy. For example in the two sleeper class example, the sensor node 10 establishes the average residual energy as the threshold. Consequently, if the residual energy of the sensor node 10 exceeds the average residual energy, the sensor node 10 establishes itself as a short sleeper; otherwise, the sensor node 10 establishes itself as a long sleeper.

In another exemplary embodiment, the sensor node 10 ranks itself and the neighbor sensor nodes 10 based on descending residual energy, and establishes its sleeper class based on its rank. For example, in the two sleeper class embodiment, if the sensor node 10 has a rank in the upper half of ranked sensor nodes 10, the sensor node 10 establishes itself as a short sleeper; otherwise, the sensor node 10 establishes itself as a long sleeper.

Next, the embodiment of adaptively changing the sleeper class that considers the node density in the neighborhood of the sensor node 10 will be described. In this embodiment, during the neighborhood control interval, the sensor nodes 10 also indicate their current sleeper class in their sent messages. From these messages, each sensor node 10 determines the number of neighbor nodes. If this number, referred to as the neighbor node density, exceeds a threshold value or if the sensor node 10 already qualifies as a relay node, then the sensor node 10 determines its sleeper class according to one of the above-described methods. However, if the neighbor node density fails to exceed a threshold value and the sensor node 10 does not qualify as a relay node, the sensor node 10 changes its sleeper class to the highest sleeper class that qualifies the sensor node 10 as a relay node.

As a further aspect of the present invention, when a sensor node 10 determines to change its sleeper class, the sensor node 10 may perform any well-known back-off operation (e.g., a back-off operation used to prevent collisions between communications) before changing sleeper class. The back-off operation randomly delays the change in sleeper class by a number of neighborhood control interval occurrences. Alternatively, a staggered schedule akin to awakening slots may be employed in order to change sleeper class. Accordingly, if the sensor node 10 determines that no change or a different change in sleeper class should take place during a subsequent neighborhood control interval and before expiration of the back-off period, the sensor node 10 does not change sleeper class as determined.

The thresholds described with respect to the present invention are design parameters that are set by the network designer based on network specifications, etc.

The per-hop delay can be significantly reduced using the methodologies of the present invention because of the deterministic -staggered sleep schedules within the immediate neighborhood of each node. The sleep pattern is autonomously adjusted in a dynamic manner to control the latency, node density and/or residual energy within the neighborhood. Furthermore, there is no need to explicitly exchange sleep schedule information within the immediate neighborhood of each node; this information can be derived from information that is exchanged during the neighborhood control interval. And, the slotted awakening structure and staggered sleep periods created by the sleeper classes results in both a reduction in latencies and energy consumption.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

What is claimed is:

1. In a multiple node network, a method comprising:
  receiving, at least one node, residual energies from neighboring nodes;
  waking up the least one node from a sleep mode after sleeping a period of time determined based on a residual energy of the at least one node and the received residual energies for the neighboring nodes and during one or more wake-up slots of a network time-slotted frame, the sleep mode being a low power consumption mode;
  receiving data, at the awakened node, from one or more neighboring nodes that may have transmitted data during one or more of the wake-up slots of the awakened node;
  determining, at the awakened node, if one or more neighboring nodes belonging to one or more sleeper classes will awaken using a wake-up determination process employed by the one or more neighboring nodes and the received data, the sleeper classes including at least a short sleeper class and a long sleeper class; and
  transmitting, from the awakened node, in one or more wake-up slots of the neighboring nodes, if there is data to be sent to one or more of the neighboring nodes, based on the determination of when the neighboring nodes wake up from their respective sleep modes.

2. The method of claim 1, further comprising:
  determining the associated slot(s) for the at least one node to awaken in using a predetermined process.

3. The method of claim 2, wherein the predetermined process is based on an address of the at least one node.

4. The method of claim 3, further comprising:
  receiving addresses of neighboring nodes at the node such that the at least one
  node knows when the neighboring nodes wake up from their respective sleep modes.

5. The method of claim 4, further comprising:
  waking up the at least one node from the sleep mode during a neighborhood control interval; and wherein
  the receiving step receives the addresses during the neighborhood control interval.

6. The method of claim 4, further comprising:
  determining a neighboring node based on signal strengths of signals received from other nodes in the network.

7. The method of claim 4, further comprising:
  directing transmission from the awakened node towards a destination based on the knowledge of when the neighboring nodes wake up from their respective sleep modes.

8. The method of claim 3, further comprising:
  waking up the at least one node from the sleep mode during a neighborhood control interval; and
  transmitting the address of the node during the neighborhood control interval.

9. The method of claim 1, wherein waking wakes up the at least one node after sleeping a period of time determined based on a residual energy of the at least one node.

10. The method of claim 1, wherein waking wakes up the at least one node after sleeping a period of time determined based on the residual energy of the at least one node and a density of neighboring nodes.

11. The method of claim 10, wherein waking wakes up the at least one node after sleeping a period of time determined based on the residual energy of the at least one node, the received residual energies for neighboring nodes, and the density of the neighboring nodes.

* * * * *

UNITED STATES PATENT AND TRADEMARK OFFICE
CERTIFICATE OF CORRECTION

PATENT NO. : 7,356,561 B2 Page 1 of 1
APPLICATION NO. : 10/426691
DATED : April 8, 2008
INVENTOR(S) : Balachandran et al.

It is certified that error appears in the above-identified patent and that said Letters Patent is hereby corrected as shown below:

In claim 1, at column 7, line 13, please change "receiving, at least one node" to --receiving, at at least one node--.

Signed and Sealed this

Twenty-second Day of June, 2010

David J. Kappos
*Director of the United States Patent and Trademark Office*